(12) United States Patent
Kim et al.

(10) Patent No.: US 9,340,153 B2
(45) Date of Patent: May 17, 2016

(54) WARNING ALARM APPARATUS AND METHOD FOR STEERING WHEEL

(71) Applicant: Soongsil University Research Consortium Techno-Park, Seoul (KR)

(72) Inventors: Jin Oh Kim, Seoul (KR); Dae Jong Kim, Siheung-si (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 14/467,520

(22) Filed: Aug. 25, 2014

(65) Prior Publication Data

US 2015/0054637 A1     Feb. 26, 2015

(30) Foreign Application Priority Data

Aug. 26, 2013    (KR) .................. 10-2013-0101012

(51) Int. Cl.
| | |
|---|---|
| *B60Q 9/00* | (2006.01) |
| *B60W 50/14* | (2012.01) |
| *B60W 50/16* | (2012.01) |
| *B60R 16/023* | (2006.01) |
| *G08B 21/06* | (2006.01) |
| *G07C 5/08* | (2006.01) |

(52) U.S. Cl.
CPC .............. *B60Q 9/00* (2013.01); *B60R 16/0232* (2013.01); *B60W 50/14* (2013.01); *B60W 50/16* (2013.01); *G07C 5/0816* (2013.01); *G08B 21/06* (2013.01)

(58) Field of Classification Search
CPC ........ B60W 50/16; B60W 50/14; B60Q 9/00; G07C 5/0816; G08B 21/06
See application file for complete search history.

(56) References Cited

U.S. PATENT DOCUMENTS

| | | | |
|---|---|---|---|
| 2008/0068187 A1* | 3/2008 | Bonefas ................. | G08B 21/06 340/575 |
| 2011/0018696 A1* | 1/2011 | Ryu ...................... | G06F 3/0338 340/407.2 |
| 2012/0242465 A1* | 9/2012 | Murata .................... | B60Q 9/00 340/407.2 |

FOREIGN PATENT DOCUMENTS

| | | |
|---|---|---|
| JP | 08-161667 A | 6/1996 |
| JP | 2007-137387 A | 6/2007 |
| JP | 2013-107455 A | 6/2013 |
| KR | 10-2004-0038951 A | 5/2004 |

\* cited by examiner

*Primary Examiner* — Steven Lim
*Assistant Examiner* — Hongmin Fan
(74) *Attorney, Agent, or Firm* — Pearne & Gordon LLP

(57) ABSTRACT

A warning alarm apparatus for a steering wheel includes at least one piezoelectric transducer provided in the rim of the steering wheel; a current supplier; one or more sensors, equipped in the steering wheel or a motor vehicle, sense a dangerous factor; and a controller that determines whether a sensor value sensed by the sensor is included in a warning alarm range, and controls operation of the current supplier according to the sensor value.

6 Claims, 6 Drawing Sheets

WARNING ALARM APPARATUS AND METHOD FOR STEERING WHEEL

CROSS-REFERENCE TO RELATED APPLICATION

This application claims the benefit of Korea Patent Application No. 2013-0101012 filed on Aug. 26, 2013, the entire disclosure of which is incorporated herein by reference.

TECHNICAL FIELD

The embodiments described herein pertain generally to a warning alarm apparatus and method for a steering wheel.

BACKGROUND

A motor vehicle can sense a danger or defect arising in the motor vehicle and alarm it to a driver. Generally used alarm methods use a lamp of a gauge or sound. However, such alarm methods have several problems. For the alarm method using a lamp, the driver cannot be immediately aware of change in the lamp of the gauge since the driver's view is directed toward the outside. For the alarm method using sound, it is difficult to recognize the sound because of interference by external noise. Further, the alarm method using sound would be useless to a hearing-impaired person. Thus, as an important matter related to safety, it may be desirable to develop a warning alarm apparatus capable of reliably sensing a danger or defect and alarming it to the driver.

Today's steering wheels include functions to control a motor vehicle, in addition to the simple steering function. For example, a steering wheel may be equipped with various up-to-date functional operating devices such as an audio control switch and a constant speed driving switch. However, there has been no sufficient research on warning a danger through a steering wheel when the danger is sensed.

In this regard, Korean Patent Application Publication No. 2004-0038951 (Title of Invention: Warning Apparatus and Method Using Vibration of Steering Wheel) suggests a warning apparatus and method using vibration of a steering wheel, by which the steering wheel is provided with a vibration motor used for common communication devices. When a warning light for an emergency situation is displayed, the vibration motor operates to increase the user's awareness.

SUMMARY

In view of the foregoing, example embodiments provide warning alarms for a danger by vibrating a steering wheel by using a piezoelectric transducer.

In one example embodiment, there is provided a warning alarm apparatus for a steering wheel. The warning alarm apparatus for a steering wheel includes at least one piezoelectric transducer provided in the rim of the steering wheel; a current supplier; one or more sensors, equipped in the steering wheel or a motor vehicle, sense a dangerous factor; and a controller that determines whether a sensor value sensed by the sensor is included in a warning alarm range, and controls operation of the current supplier according to the sensor value. If the sensor value is included in the warning alarm range, the controller operates the current supplier to supply driving currents to the piezoelectric transducer, and the piezoelectric transducer converts the driving currents supplied from the current supplier into vibration to vibrate the steering wheel.

In another example embodiment, there is provided a warning alarm method using a warning alarm apparatus for a steering wheel. The warning alarm method using a warning alarm apparatus for a steering wheel includes sensing a dangerous factor through a sensor equipped in a steering wheel or a motor vehicle; determining whether the sensed sensor value is included in a warning alarm range; and supplying driving currents to a piezoelectric transducer provided in the rim of the steering wheel if the sensor value is included in the warning alarm range. The piezoelectric transducer converts the supplied driving currents into vibration to vibrate the steering wheel.

In accordance with the above-described example embodiments, a piezoelectric transducer having a simple structure is equipped in a steering wheel to vibrate the steering wheel, and thereby, warni a driver of a danger.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
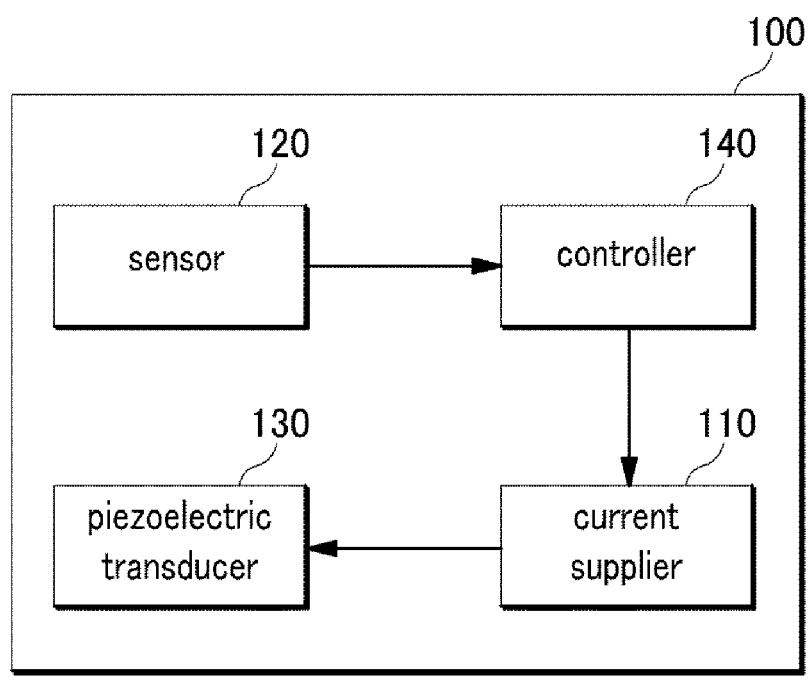
FIG. 1 is a block diagram of a warning alarm apparatus in accordance with an example embodiment.

Hereinafter, example embodiments will be described in detail with reference to the accompanying drawings so that the inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

FIG. 1 is a block diagram of a warning alarm apparatus in accordance with an example embodiment. A warning alarm apparatus 100 in accordance with an example embodiment includes a current supplier 110, a sensor 120, a piezoelectric transducer 130 and a controller 140. The current supplier 110 may apply currents to the piezoelectric transducer 130.

At least one sensor 120, equipped in a steering wheel or a motor vehicle, senses a dangerous factor. For example, the sensor may include common sensors for alarms displayed on a gauge such as a vehicle speed sensor, a cooling water temperature sensor, and/or a rear sensor. Additionally, the sensor may include sensors to be equipped in a steering wheel or a motor vehicle as new technologies for sensing dangers are developed. Through the sensors, changes of a motor vehicle can be sensed during driving.

Figure 2:
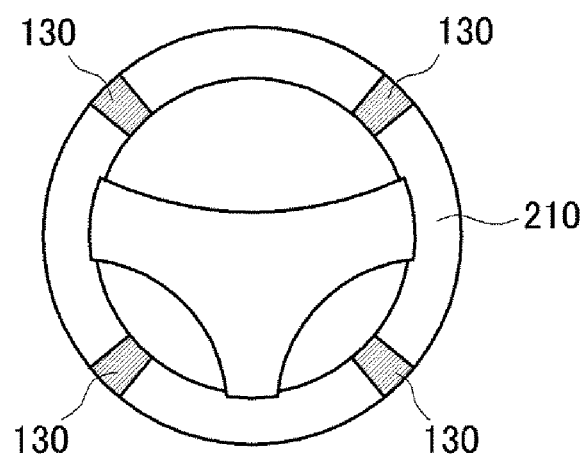
FIG. 2 shows an example for a steering wheel provided with a piezoelectric transducer in accordance with an example embodiment.

At least one piezoelectric transducer 130 is provided in the rim of the steering wheel. For example, a total four piezoelectric transducers 130 may be provided in four cardinal directions of the steering wheel, respectively. FIG. 2 shows an example for a steering wheel provided with piezoelectric transducers 130. As illustrated in FIG. 2, four piezoelectric transducers 130 may be provided at the positions quartering the steering wheel 210, respectively. With respect to a method for providing the piezoelectric transducer 130, a space is created between the rim frame of the steering wheel and the skin wrapping the rim of the steering wheel, and a groove is made in the rim frame to provide the piezoelectric transducer 130 therein.

Figure 3:
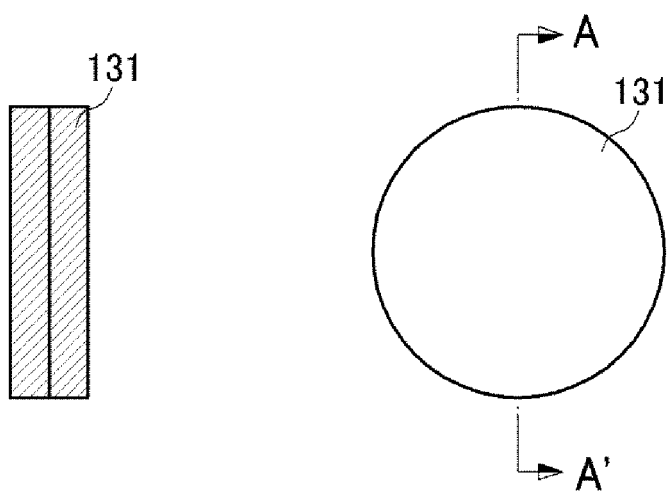
FIGS. 3A and 3B show front and cross-section views of one example shape of the piezoelectric transducer in accordance with an example embodiment.
Figure 4:
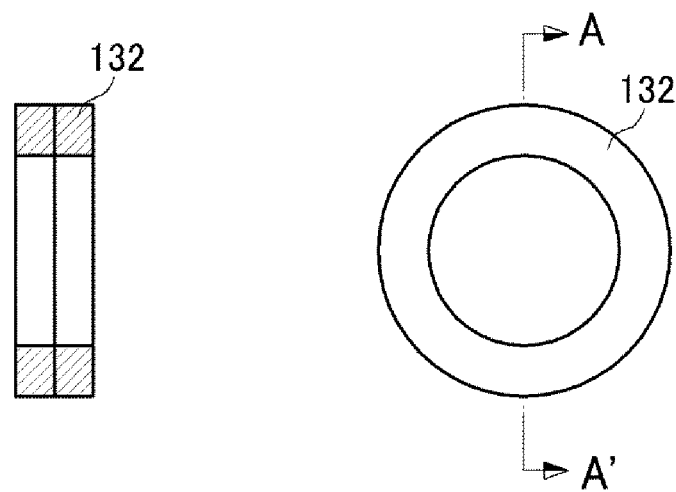
FIGS. 4A and 4B show front and cross-section views of one example shape of the piezoelectric transducer in accordance with an example embodiment.
Figure 5:
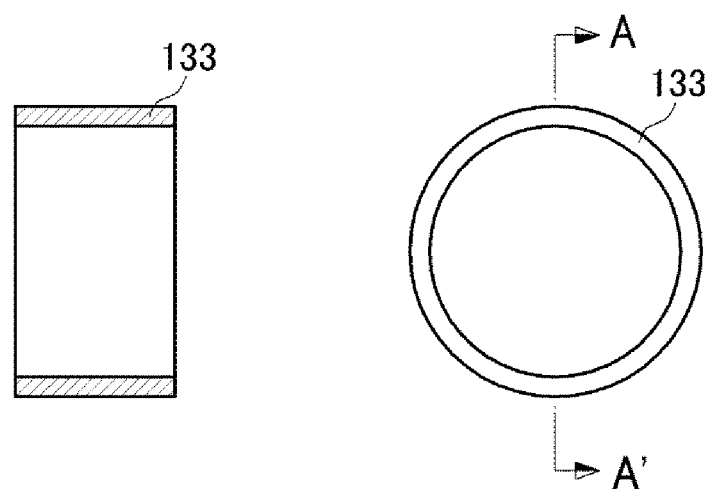
FIGS. 5A and 5B show front and cross-section views of one example shape of the piezoelectric transducer in accordance with an example embodiment.

In addition, the piezoelectric transducer 130 may have a disc, disc-ring or cylindrical shape. That is, the piezoelectric transducer 130 may be manufactured in various forms based on a circular shape to fit the circular steering wheel 210. The piezoelectric transducer 130 in various forms is described with reference to FIGS. 3A, 3B, 4A, 4B, 5A, and 5B. First, FIG. 3A shows a cross section view and FIG. 3B shows a front view of a disc-shaped piezoelectric transducer 131. It is identified that the disc-shaped piezoelectric transducer 131 is in the form that the front surface thereof is fully closed. FIG. 4A shows a cross section view and FIG. 4B shows a front view of a disc ring-shaped piezoelectric transducer 132. It is identified that the disc ring-shaped piezoelectric transducer 132 is in the form of a thick ring, of which the center portion is punched. FIG. 5A shows a cross section view and FIG. 5B shows a front view of a cylinder-shaped piezoelectric transducer 133. It is identified that the ring of the cylinder-shaped piezoelectric transducer 133 is thinner but the cross-section of the cylinder shaped piezoelectric transducer 133 is wider than the disc ring-shaped piezoelectric transducer 132. As described, the piezoelectric transducers 130, 131, 132 and 133 may have various circular shapes to be provided in the steering wheel 210. In this case, a diameter of each of the piezoelectric transducers 130, 131, 132 and 133 may be the same as a cross section diameter of the rim of the steering wheel or smaller or larger than the cross section diameter of the rim of the steering wheel, within a range of 2 mm. This configuration is intended to provide the piezoelectric transducers 130, 131, 132 and 133 to fit the steering wheel 210 so that a driver feels no unfamiliarity when holding the steering wheel 210 and has no interruption when steering the motor vehicle.

Returning to FIG. 1, the piezoelectric transducer 130 provided in the steering wheel 210 converts driving currents supplied from the current supplier 110 into vibration to vibrate the steering wheel 210. That is, the piezoelectric transducer 130 can generate vibration when driving currents are applied, and may receive the driving currents from the current supplier 110. In this case, two or more disc-, disc ring- or cylinder-shaped piezoelectric transducers 130, 131, 132 and 133 may be consecutively provided, and the intensity of the vibration may be adjusted in proportion to the number of the piezoelectric transducers. That is, if two or more piezoelectric transducers 130 are provided to be contacted with each other, the intensity of vibration to be generated can increase in proportion with the number of the piezoelectric transducers 130. For example, if there is a portion where two piezoelectric transducers 130 are consecutively provided, and a portion where three piezoelectric transducers 130 are consecutively provided, the intensity at the portion where three piezoelectric transducers 130 are consecutively provided may be stronger. Adjusting the intensity may be utilized to adjust the intensity that a driver can feel, or based on a level of danger that should be warned to a driver.

The controller 140 determines whether a sensor value sensed in the sensor 120 is included in a warning alarm range, and controls the operation of the current supplier 110 according to the sensor value. If the sensor value is included in the warning alarm range, the controller 140 operates the current supplier 110 to supply driving currents to the piezoelectric transducer 130. That is, if the sensor value is included in the warning alarm range, the controller 140 may operate the current supplier 140 to vibrate the piezoelectric transducer 130.

In addition, the controller 140 may enable driving currents to be supplied to different piezoelectric transducers 130 at different timings according to a type of a sensor value or a warning alarm level. For example, the controller 140 may enable weak vibration to be provided three consecutive times when fuel is running out, and each of strong long vibration and strong short vibration to be provided once immediately before the motor vehicle contacts an object while being driven backward. That is, as a message in Morse code is sent, the controller 140 may discriminate and provide a typical vibration form of alarm according to a type of a sensor value or a warning alarm level.

Figure 6:
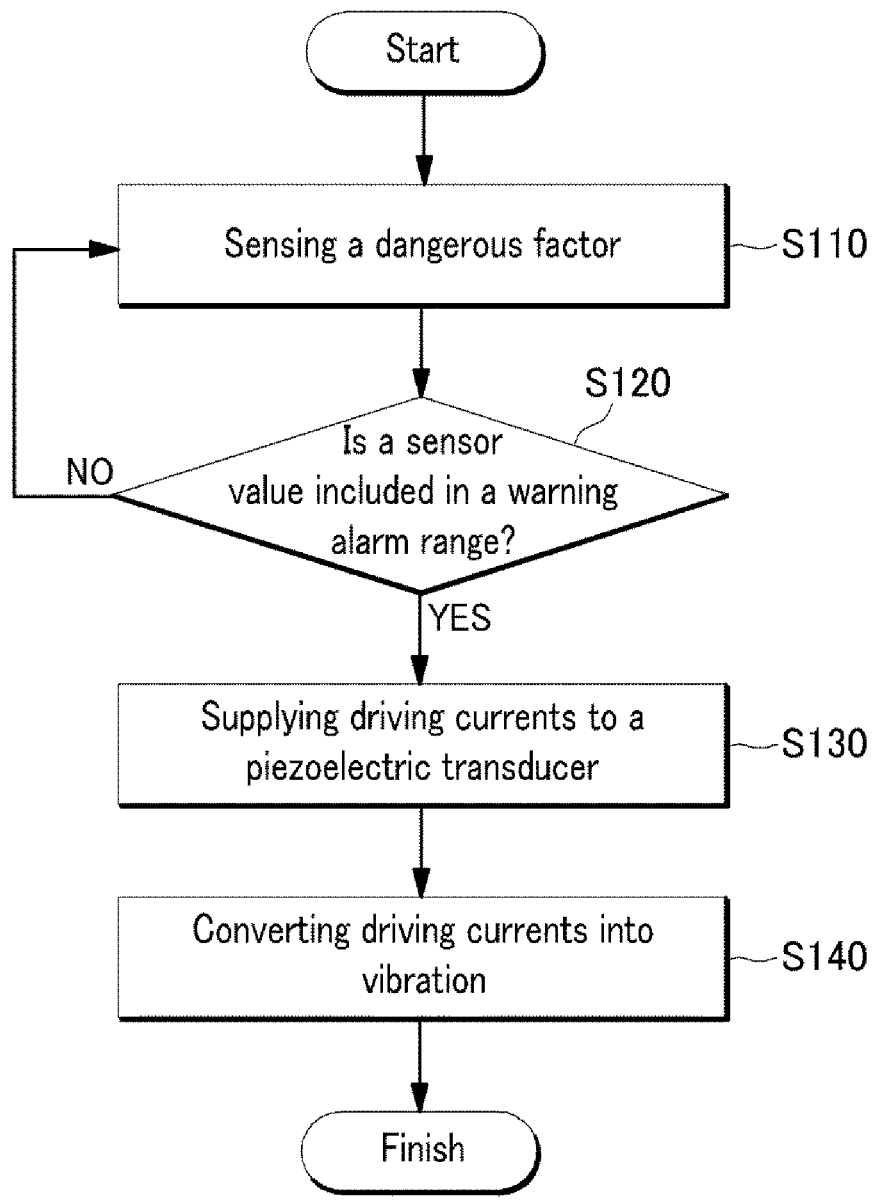
FIG. 6 is a flow chart of a warning alarm method using the warning alarm apparatus in accordance with an example embodiment.

FIG. 6 is a flow chart of a warning alarm method through the warning alarm apparatus in accordance with an example embodiment.

In S110, a dangerous factor may be sensed through one or more sensors equipped in a steering wheel or a motor vehicle. In this case, the sensor may include a sensor commonly equipped in a steering wheel or a motor vehicle.

In S120, it may be determined whether a sensed sensor value is included in a warning alarm range. When a dangerous factor is sensed in S110, a sensor value is generated. It may then be determined whether the generated sensor value is in a warning alarm range according to a pre-set value.

In S130, if the sensor value is in the warning alarm range, driving currents may be supplied to the piezoelectric transducer provided in the rim of the steering wheel. In addition, in S130, driving currents may be supplied to different piezoelectric transducers at different timings according to a type of a sensor value or a warning alarm level. For example, when a warning alarm is divided into "high, moderate, and low" levels, if the sensor value is included in the warning alarm range for the "high" level, driving currents for strongly and repeatedly vibrating all the provided piezoelectric transducers may be supplied. If the sensor value is included in the warning alarm range for the "moderate" level, driving currents for alternatively vibrating the halved piezoelectric transducers with medium-low intensity may be supplied. If the sensor value is included in the warning alarm range for the "low" level, driving currents for weakly vibrating the provided piezoelectric transducers one after another may be supplied. Driving currents for differently vibrating the piezoelectric transducers by warning alarm levels may be supplied in other various embodiments.

In S140, the piezoelectric transducers may convert the supplied driving currents into vibration to vibrate the steering wheel.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

EXPLANATION OF CODES

| | |
|---|---|
| 100: warning alarm apparatus | 110: current supplier |
| 120: sensor | 130, 131, 132, 133: piezoelectric transducers |
| 140: controller | |

We claim:

1. A warning alarm apparatus for a steering wheel, comprising:
   at least one piezoelectric transducer provided in a rim of the steering wheel;
   a current supplier;
   one or more sensors, equipped in the steering wheel or a motor vehicle to sense a dangerous factor; and
   a controller configured to determine whether a sensor value sensed by the one or more sensors is within a warning alarm range, and to control operation of the current supplier according to the sensor value;
   wherein if the sensor value is within the warning alarm range, the controller operates the current supplier to supply driving currents to the at least one piezoelectric transducer, and
   the at least one piezoelectric transducer converts the driving currents supplied from the current supplier into a vibration to vibrate the steering wheel,
   wherein the at least one piezoelectric transducer is of a disc, disc ring or cylindrical shape,
   wherein the at least one piezoelectric transducer comprises two or more disc, disc ring or cylinder shaped consecutive piezoelectric transducers, and
   an intensity of the vibration is adjusted in proportion to the number of the piezoelectric transducers.

2. The warning alarm apparatus of claim 1, wherein a diameter of the at least one piezoelectric transducer is the same as or within 2 mm of a cross section diameter of the rim of the steering wheel.

3. The warning alarm apparatus of claim 1, wherein the controller enables driving currents to be supplied to different piezoelectric transducers at different timings according to a type of the sensor value or a warning alarm level.

4. A warning alarm method for a steering wheel, the method comprising:
   sensing a dangerous factor through one or more sensors equipped in the steering wheel or a motor vehicle;
   determining whether the sensed sensor value is within a warning alarm range; and
   supplying driving currents to at least one piezoelectric transducer provided in a rim of the steering wheel if the sensor value is within the warning alarm range,
   wherein the at least one piezoelectric transducer converts the supplied driving currents into a vibration to vibrate the steering wheel,
   wherein the at least one piezoelectric transducer is of a disc, disc ring or cylindrical shape,
   wherein the at least one piezoelectric transducer comprises two or more disc, disc ring- or cylinder shaped consecutive piezoelectric transducers, and
   an intensity of the vibration is adjusted in proportion to the number of the piezoelectric transducers.

5. The warning alarm method of claim 4, wherein a diameter of the at least one piezoelectric transducer is the same as or within 2 mm of a cross section diameter of the rim of the steering wheel.

6. The warning alarm method of claim 4, wherein the supplying of driving currents supplies driving currents to different piezoelectric transducers at different timings according to a type of the sensor value or a warning alarm level.

* * * * *